United States Patent
Karampatsis et al.

(10) Patent No.: US 12,506,703 B2
(45) Date of Patent: Dec. 23, 2025

(54) DOMAIN NAME SYSTEM DETERMINATION

(71) Applicant: Lenovo (Singapore) Pte. Ltd., New Tech Park (SG)

(72) Inventors: Dimitrios Karampatsis, Ruislip (GB); Apostolis Salkintzis, Athens (GR); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 16 days.

(21) Appl. No.: 18/681,190

(22) PCT Filed: Sep. 9, 2021

(86) PCT No.: PCT/EP2021/074876
§ 371 (c)(1),
(2) Date: Feb. 5, 2024

(87) PCT Pub. No.: WO2023/011741
PCT Pub. Date: Feb. 9, 2023

(65) Prior Publication Data
US 2024/0283772 A1 Aug. 22, 2024

(30) Foreign Application Priority Data
Aug. 3, 2021 (GR) .............................. 20210100530

(51) Int. Cl.
*H04L 61/4511* (2022.01)
*H04L 61/00* (2022.01)
*H04L 61/4541* (2022.01)

(52) U.S. Cl.
CPC .......... *H04L 61/4511* (2022.05); *H04L 61/35* (2013.01); *H04L 61/4541* (2022.05)

(58) Field of Classification Search
None
See application file for complete search history.

(56) References Cited

U.S. PATENT DOCUMENTS 9,967,232 B1 * 5/2018 Royt ...................... H04L 61/00
12,132,820 B1 * 10/2024 Sheth ................... H04L 9/3239
(Continued)

FOREIGN PATENT DOCUMENTS

WO    WO-2021032118 A1 *    2/2021    ........... H04L 45/121

OTHER PUBLICATIONS

PCT/EP2021/074876, "Notification of Transmittal of the International Search Report and the Written Opinion of the International Searching Authority, or the Declaration", International Searching Authority, Mar. 22, 2022, pp. 1-15.

(Continued)

*Primary Examiner* — Phyllis A Book
(74) *Attorney, Agent, or Firm* — Kunzler Bean & Adamson

(57) ABSTRACT

Apparatuses, methods, and systems are disclosed for domain name system determination. One method includes transmitting, from a first network function, first instructions to a second network function. The first instructions indicate forwarding DNS requests received from an application in a first device to the first network function. The method includes receiving, from the second network function, a first DNS request received from an application in the first device based on the first instructions. The DNS request includes a FQDN. The method includes determining to use network analytics from a third network function to determine an application server for the FQDN. The method includes transmitting a first request to the third network function. The first request includes: a request for data network performance analytics; the FQDN; a device identity of the first device; and/or a current location of the first device.

20 Claims, 8 Drawing Sheets

(56) References Cited

U.S. PATENT DOCUMENTS

| | | | | |
|---|---|---|---|---|
| 12,245,117 | B1* | 3/2025 | Scriber | H04L 12/4625 |
| 2002/0059622 | A1* | 5/2002 | Grove | H04L 61/4541 |
| | | | | 725/91 |
| 2020/0137024 | A1* | 4/2020 | Janakiraman | H04L 63/0236 |
| 2023/0199480 | A1* | 6/2023 | Tao | H04L 67/1021 |
| | | | | 370/338 |
| 2023/0353455 | A1* | 11/2023 | Zhu | H04L 41/0895 |
| 2023/0362127 | A1* | 11/2023 | Korja | H04L 61/4511 |
| 2023/0379293 | A1* | 11/2023 | Muñoz De La Torre Alonso | |
| | | | | H04L 61/2557 |
| 2024/0056415 | A1* | 2/2024 | Tang | H04L 61/4511 |
| 2024/0323824 | A1* | 9/2024 | He | H04W 48/16 |

OTHER PUBLICATIONS

Motorola Mobility et al., "Solution for Key Issue 16—Selecting an Edge Application Server based on NWDAF analytics", 3GPP TSG-SA WG2 Meeting #139e S2-2003803, Jun. 1-12, 2020, pp. 1-8.

Vivo, "Behaviour of NWDAF for optimization in eEDGE", SA WG2 Meeting #145E e-meeting S2-2104363, May 17-28, 2021, pp. 1-2.

Lenovo et al., "SMF selecting an EAS application server by taking into account NWDAF analytics", 3GPP TSG-SA WG2 Meeting #145e S2-2104614, May 17-28, 2021, pp. 1-7.

Lenovo et al., "SMF selecting an EAS application server by taking into account NWDAF analytics", 3GPP TSG-SA WG2 Meeting #145e S2-2105040, May 17-28, 2021, pp. 1-7.

3GPP, "3rd Generation Partnership Project; Technical Specification Group Services and System Aspects; Architecture enhancements for 5G System (5GS) to support network data analytics services (Release 17)", 3GPP TS 23.288 V17.1.0, Jun. 2021, pp. 1-192.

3GPP, "3rd Generation Partnership Project; Technical Specification Group Services and System Aspects; System architecture for the 5G System (5GS); Stage 2 (Release 17)", 3GPP TS 23.501 V17.1.0, Jun. 2021, pp. 1-526.

3GPP, "3rd Generation Partnership Project; Technical Specification Group Services and System Aspects; Procedures for the 5G System (5GS); Stage 2 (Release 17)", 3GPP TS 23.502 V17.1.0, Jun. 2021, pp. 1-692.

3GPP, "3rd Generation Partnership Project; Technical Specification Group Services and System Aspects; 5G System Enhancements for Edge Computing; Stage 2 (Release 17)", 3GPP TS 23.548 V1.0.0, Jun. 2021, pp. 1-48.

* cited by examiner

DOMAIN NAME SYSTEM DETERMINATION

FIELD

The subject matter disclosed herein relates generally to wireless communications and more particularly relates to domain name system determination.

BACKGROUND

In certain wireless communications networks, domain name system message handing rules may be constructed for a domain name system. A domain name system used for the domain name system message handing rules may not be the best domain name system.

BRIEF SUMMARY

Methods for domain name system determination are disclosed. Apparatuses and systems also perform the functions of the methods. One embodiment of a method includes transmitting, from a first network function, first instructions to a second network function. The first instructions indicate forwarding domain name system requests from an application in a first device to the first network function. In some embodiments, the method includes receiving, from the second network function, a first domain name system request received from an application in the first device based on the first instructions. The domain name system request includes a fully qualified domain name. In certain embodiments, the method includes determining to use network analytics from a third network function to determine an application server for the fully qualified domain name. In various embodiments, the method includes transmitting a first request to the third network function. The first request includes: a request for data network performance analytics; the fully qualified domain name; a device identity of the first device; a current location of the first device; or some combination thereof. In some embodiments, the method includes receiving a response to the first request. The response includes a list of application server addresses and associated performance information. In certain embodiments, the method includes selecting the application server from the list of application server addresses based on the associated performance information. In various embodiments, the method includes determining second instructions for the second network function. The second instructions indicate to construct a domain name system response to reply to the first domain name system request, and the second instructions indicate the selected application server. In some embodiments, the method includes transmitting the second instructions to the second network function. The second instructions include an indication to create the domain name system response indicating the selected application server.

One apparatus for domain name system determination includes a first network function. In some embodiments, the apparatus includes a transmitter that transmits first instructions to a second network function. The first instructions indicate forwarding domain name system requests from an application in a first device to the first network function. In various embodiments, the apparatus includes a receiver that receives, from the second network function, a first domain name system request received from an application in the first device based on the first instructions. The domain name system request includes a fully qualified domain name. In certain embodiments, the apparatus includes a processor that determines to use network analytics from a third network function to determine an application server for the fully qualified domain name. The transmitter transmits a first request to the third network function. The first request includes: a request for data network performance analytics; the fully qualified domain name; a device identity of the first device; a current location of the first device; or some combination thereof. The receiver receives a response to the first request. The response includes a list of application server addresses and associated performance information. The processor selects the application server from the list of application server addresses based on the associated performance information. The processor determines second instructions for the second network function. The second instructions indicate to construct a domain name system response to reply to the first domain name system request, and the second instructions indicate the selected application server. The transmitter transmits the second instructions to the second network function. The second instructions include an indication to create the domain name system response indicating the selected application server.

Another embodiment of a method for domain name system determination includes receiving, at a second network function a domain name system request from an application of first device. In some embodiments, the method includes determining to forward the request to a first network function. In certain embodiments, the method includes receiving instructions from a first network function. The instructions include an indication to create a domain name system response indicating a selected application server. In various embodiments, the method includes creating the domain name system response. In some embodiments, the method includes transmitting the domain name system response to the first device.

Another apparatus for domain name system determination includes a second network function. In some embodiments, the apparatus includes a receiver that receives a domain name system request from an application of first device. In various embodiments, the apparatus includes a processor that: determines to forward the request to a first network function, wherein the receiver receives instructions from a first network function, and the instructions include an indication to create a domain name system response indicating a selected application server; and creates the domain name system response. In certain embodiments, the apparatus includes a transmitter that transmits the domain name system response to the first device.

A further embodiment of a method for domain name system determination includes transmitting, from a first network function, first instructions to a second network function. The first instructions indicate forwarding domain name system requests from an application in a first device to the first network function. In some embodiments, the method includes receiving, from the second network function, a first domain name system request received from an application in the first device based on the first instructions. The domain name system request includes a fully qualified domain name. In some embodiments, the method includes determining to use network analytics from a third network function to determine an application server for the fully qualified domain name. In certain embodiments, the method includes determining second instructions. The second instructions include an indication to request data network performance analytics at a current location of the first device from a third network function. In various embodiments, the method includes transmitting a first request to the second network function. The first request includes the second instructions and the current location of the device. In some embodiments, the method includes receiving a response to the first request. The response includes a list of application server addresses and associated performance information. In certain embodiments, the method includes selecting the application server from the list of application server addresses based on the associated performance information. In various embodiments, the method includes determining third instructions for the second network function. The third instruction indicate to construct a domain name system response to reply to the first domain name system request, and the third instructions indicate the selected application server. In some embodiments, the method includes transmitting the third instructions to the second network function. The third instructions include an indication to create the domain name system response indicating the selected application server.

A further apparatus for domain name system determination includes a first network function. In some embodiments, the apparatus includes a transmitter that transmits first instructions to a second network function. The first instructions indicate forwarding domain name system requests from an application in a first device to the first network function. In various embodiments, the apparatus includes a receiver that receives, from the second network function, a first domain name system request received from an application in the first device based on the first instructions. The domain name system request includes a fully qualified domain name. In certain embodiments, the apparatus includes a processor that: determines to use network analytics from a third network function to determine an application server for the fully qualified domain name; and determines second instructions. The second instructions include an indication to request data network performance analytics at a current location of the first device from a third network function. The transmitter transmits a first request to the second network function. The first request includes the second instructions and the current location of the device. The receiver receives a response to the first request. The response includes a list of application server addresses and associated performance information. The processor selects the application server from the list of application server addresses based on the associated performance information. The processor determines third instructions for the second network function. The third instruction indicate to construct a domain name system response to reply to the first domain name system request, and the third instructions indicate the selected application server. The transmitter transmits the third instructions to the second network function. The third instructions include an indication to create the domain name system response indicating the selected application server.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
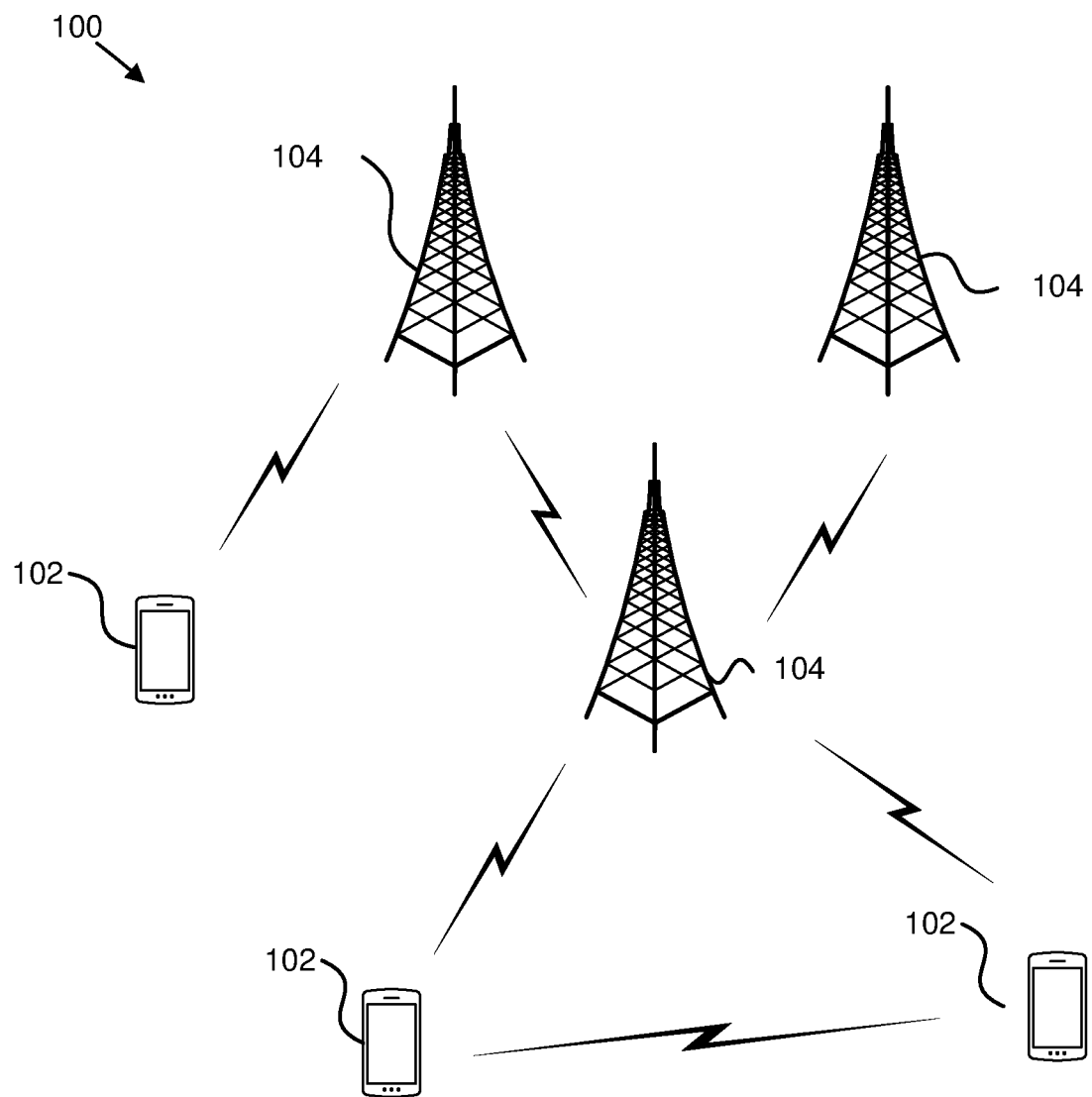
FIG. 1 is a schematic block diagram illustrating one embodiment of a wireless communication system for domain name system determination.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code May be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for domain name system determination. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a network unit 104 may transmit, from a first network function, first instructions to a second network function. The first instructions indicate forwarding domain name system requests from an application in a first device to the first network function. In some embodiments, the network unit 104 may receive, from the second network function, a first domain name system request received from an application in the first device based on the first instructions. The domain name system request includes a fully qualified domain name. In certain 20) embodiments, the network unit 104 may determine to use network analytics from a third network function to determine an application server for the fully qualified domain name. In various embodiments, the network unit 104 may transmit a first request to the third network function. The first request includes: a request for data network performance analytics; the fully qualified domain name; a device identity of the first device; a current location of the first device; or some combination thereof. In some embodiments, the network unit 104 may receive a response to the first request. The response includes a list of application server addresses and associated performance information. In certain embodiments, the network unit 104 may select the application server from the list of application server addresses based on the associated performance information. In various embodiments, the network unit 104 may determine second instructions for the second network function. The second instructions indicate to construct a domain name system response to reply to the first domain name system request, and the second instructions indicate the selected application server. In some embodiments, the network unit 104 may transmit the second instructions to the second network function. The second instructions include an indication to create the domain name system response indicating the selected application server. Accordingly, the network unit 104 may be used for domain name system determination.

In some embodiments, a network unit 104 may receive, at a second network function a domain name system request from an application of first device. In some embodiments, the network unit 104 may determine to forward the request to a first network function. In certain embodiments, the network unit 104 may receive instructions from a first network function. The instructions include an indication to create a domain name system response indicating a selected application server. In various embodiments, the network unit 104 may create the domain name system response. In some embodiments, the method includes transmitting the domain name system response to the first device. Accordingly, the network unit 104 may be used for domain name system determination.

In various embodiments, a network unit 104 may transmit, from a first network function, first instructions to a second network function. The first instructions indicate forwarding domain name system requests from an application in a first device to the first network function. In some embodiments, the network unit 104 may receive, from the second network function, a first domain name system request received from an application in the first device based on the first instructions. The domain name system request includes a fully qualified domain name. In some embodiments, the network unit 104 may determine to use network analytics from a third network function to determine an application server for the fully qualified domain name. In certain embodiments, the network unit 104 may determine second instructions. The second instructions include an indication to request data network performance analytics at a current location of the first device from a third network function. In various embodiments, the network unit 104 may transmit a first request to the second network function. The first request includes the second instructions and the current location of the device. In some embodiments, the network unit 104 may receive a response to the first request. The response includes a list of application server addresses and associated performance information. In certain embodiments, the network unit 104 may select the application server from the list of application server addresses based on the associated performance information. In various embodiments, the network unit 104 may determine third instructions for the second network function. The third instruction indicate to construct a domain name system response to reply to the first domain name system request, and the third instructions indicate the selected application server. In some embodiments, the network unit 104 may transmit the third instructions to the second network function. The third instructions include an indication to create the domain name system response indicating the selected application server. Accordingly, the network unit 104 may be used for domain name system determination.

Figure 2:
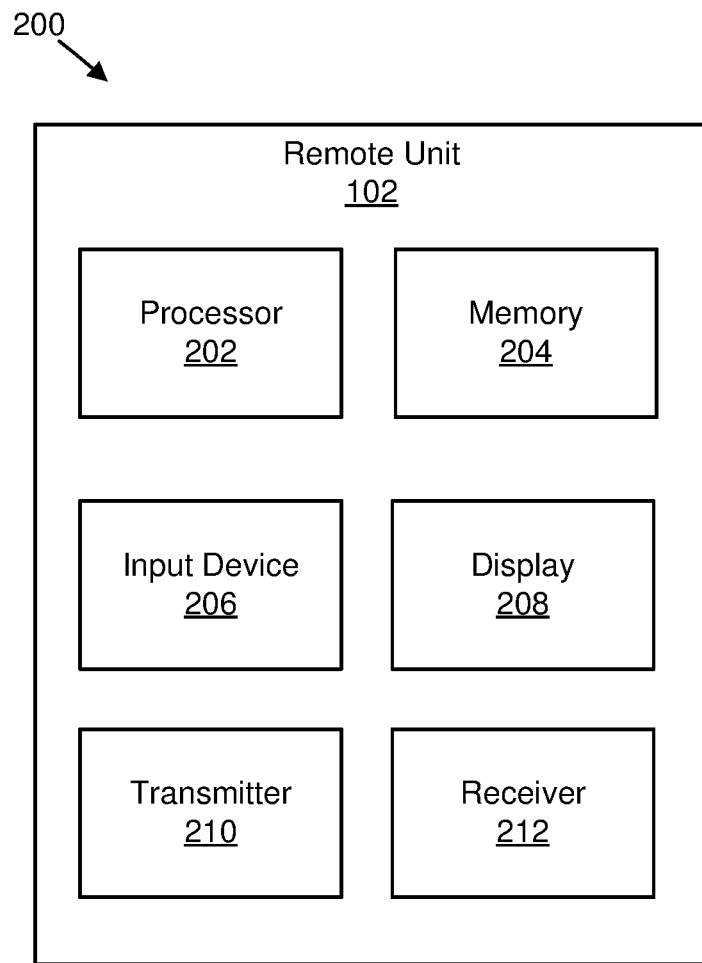
FIG. 2 is a schematic block diagram illustrating one embodiment of an apparatus that may be used for domain name system determination.

FIG. 2 depicts one embodiment of an apparatus 200 that may be used for domain name system determination. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
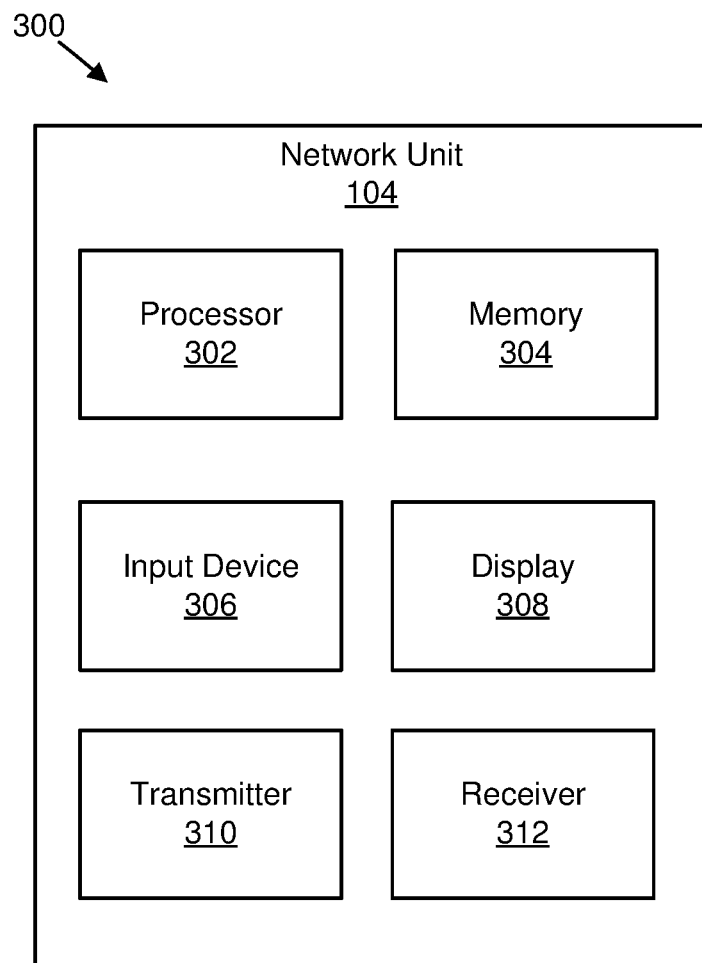
FIG. 3 is a schematic block diagram illustrating one embodiment of an apparatus that may be used for domain name system determination.

FIG. 3 depicts one embodiment of an apparatus 300 that may be used for domain name system determination. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 transmits first instructions to a second network function. The first instructions indicate forwarding domain name system requests from an application in a first device to the first network function. In various embodiments, the receiver 312 receives, from the second network function, a first domain name system request received from an application in the first device based on the first instructions. The domain name system request includes a fully qualified domain name. In certain embodiments, the processor 302 determines to use network analytics from a third network function to determine an application server for the fully qualified domain name. The transmitter 310 transmits a first request to the third network function. The first request includes: a request for data network performance analytics; the fully qualified domain name; a device identity of the first device; a current location of the first device; or some combination thereof. The receiver 312 receives a response to the first request. The response includes a list of application server addresses and associated performance information. The processor 302 selects the application server from the list of application server addresses based on the associated performance information. The processor 302 determines second instructions for the second network function. The second instructions indicate to construct a domain name system response to reply to the first domain name system request, and the second instructions indicate the selected application server. The transmitter 310 transmits the second instructions to the second network function. The second instructions include an indication to create the domain name system response indicating the selected application server.

In some embodiments, the receiver 312 receives a domain name system request from an application of first device. In various embodiments, the processor 302: determines to forward the request to a first network function, wherein the receiver receives instructions from a first network function, and the instructions include an indication to create a domain name system response indicating a selected application server; and creates the domain name system response. In certain embodiments, the transmitter 310 transmits the domain name system response to the first device.

In various embodiments, the transmitter 310 transmits first instructions to a second network function. The first instructions indicate forwarding domain name system requests from an application in a first device to the first network function. In various embodiments, the receiver 312 receives, from the second network function, a first domain name system request received from an application in the first device based on the first instructions. The domain name system request includes a fully qualified domain name. In certain embodiments, the processor 302: determines to use network analytics from a third network function to determine an application server for the fully qualified domain name; and determines second instructions. The second instructions include an indication to request data network performance analytics at a current location of the first device from a third network function. The transmitter 310 transmits a first request to the second network function. The first request includes the second instructions and the current location of the device. The receiver 312 receives a response to the first request. The response includes a list of application server addresses and associated performance information. The processor 302 selects the application server from the list of application server addresses based on the associated performance information. The processor 302 determines third instructions for the second network function. The third instruction indicate to construct a domain name system response to reply to the first domain name system request, and the third instructions indicate the selected application server. The transmitter 310 transmits the third instructions to the second network function. The third instructions include an indication to create the domain name system response indicating the selected application server.

In certain embodiments, in a third generation partnership program ("3GPP") architecture, a network data analytics function ("NWDAF") provides analytic output to one or more analytics consumer network functions ("NFs") based on data collected from one or more data producer NFs. In some embodiments, an NWDAF provides analytics on a data network ("DN") performance.

In various embodiments, analytic output that a NWDAF may provide is found in Table 1.

TABLE 1

| DN Service Performance Statistics and/or Predictions | |
|---|---|
| Information | Description |
| Application Identifier ("ID") | Identifies the application for which analytics information is provided. |
| Single Network Slice Selection Assistance Information ("NSSAI") ("S-NSSAI") | Identifies the Network Slice for which analytics information is provided. |
| Data Network Name ("DNN") | Identifies the data network name (e.g., "internet") for which analytics information is provided. |
| DN performance (0-x) | List of DN performances for the application. |
| >Application Server Instance Address | Identifies the Application Server Instance (Internet Protocol ("IP") address and/or fully qualified domain name ("FQDN") of the Application Server). |
| >Serving anchor UPF | The involved anchor UPF. |
| >Data Network Access Identifier ("DNAI") | Identifier of a user plane access to one or more DN(s) where applications are deployed. |
| >Performance | Performance indicators. |
| >>Average Traffic rate | Average traffic rate observed for UEs communicating with the application. |
| >>Maximum Traffic rate | Maximum traffic rate observed for UEs communicating with the application. |

TABLE 1-continued

DN Service Performance Statistics and/or Predictions

| Information | Description |
| --- | --- |
| >>Average Packet Delay | Average packet delay observed for UEs communicating with the application. |
| >>Maximum Packet Delay | Maximum packet delay for observed for UEs communicating with the application. |
| >>Average Packet Loss Rate | Average packet loss observed for UEs communicating with the application. |
| >Spatial Validity Condition | Area where the DN performance analytics applies. |
| >Temporal Validity Condition | Validity period for the DN performance analytics. |

In certain embodiments, an NWDAF derives DN performance analytics by collecting performance data from an application function ("AF") which may be associated with an edge network.

In some embodiments, as part of edge computing work, a 3GPP network may assist an application in an "edge unaware" user equipment ("UE") to establish a connection with an application server in an edge network close to the location of the UE (e.g., thus minimizing communication latency).

In various embodiments, an edge application server discovery function ("EASDF") may act as a domain name system ("DNS") proxy to UE DNS requests. The EASDF may assist a UE that is "edge network unaware" to have a connection with an application server at an edge network that is located close to the UE, hence improving the communication latency between the application in the UE and the application server. If an application in the UE sends a DNS request to discover an app server, the EASDF forwards the UE DNS request to a local DNS server or a DNS server in the cloud according to configuration (e.g., rules) received from a session management function ("SMF"). The SMF may provide rules to the EASDF based on knowledge in the edge network about the location of the UE. The SMF configures the EASDF by providing a DNS message handling rule.

Each DNS message handling rule may include the following information: 1) precedence of the DNS message handling rule; 2) DNS message detection template (includes at least one of the following): a) DNS message type=DNS query or DNS response: if DNS message type=DNS Query: then source IP address (e.g., UE IP address) and array of FQDN ranges; and if DNS message type=DNS Response: array of FQDN ranges and/or array of edge application server ("EAS") IP address ranges; and/or 3) actions (e.g., includes at least one action) the possible actions include: a) report DNS message content to SMF; b) send the DNS message to a preconfigured DNS server and/or resolver or an indicated DNS server as following (e.g., the indicated DNS server is included in the DNS handling rule): including the information to build optional edge DNS ("EDNS") client subnet option in the DNS message (e.g., the information for the EASDF to build the EDNS client subnet option is included in the DNS handling rule); b) replacement of the DNS message target address with the indicated DNS server address; if no DNS server address is provided by the SMF, then the EASDF is to forward the DNS message to a locally preconfigured DNS server and/or resolver; c) buffer the DNS message and report DNS message content to the SMF; and/or d) send the buffered DNS response message to UE.

In certain embodiments, an actual performance of an edge application server in an edge network may be taken into account if an SMF constructs DNS message handling rules for the EASDF. In contrast, in some embodiments, an EASDF forwards a UE DNS request to a congested edge network that may result in a bad user experience.

In various embodiments, a DN performance analytics (or service experience analytics) may be leveraged so that a 3GPP network selects a best performing application server in an edge network.

In a first embodiment, an SMF may request DN performance analytics to select an EAS server and construct a DNS response to a UE.

In the first embodiment, if an EASDF, based on DNS message handling rules configured by an SMF, forwards contents of a DNS query received from a UE to the SMF, the SMF, instead of sending instructions to the EASDF about how to route the DNS query, decides instead to request DN performance analytics (or service experience analytics) from an NWDAF. The contents of the DNS query and the UE location (e.g., cell ID, service area or data network access identifier ("DNAI")) may be included in the request. The NWDAF derives analytics and includes in the response the performance of EAS servers at the UE location.

The analytics requested by the SMF may provide the following information: 1) EAS IP server 1: 229.224.0.22, DNAI: "edgenetwork 1", Performance: Average Data Rate=200 Mbps; and/or 2) EAS IP server 2: 229.224.1.22, DNAI: "edgenetwork 2": Performance: Average Data Rate=100 Mbps. The SMF then selects the best performing EAS server and instructs the EASDF to construct a DNS response to the UE including in the DNS response the selected EAS server. One embodiment of the procedure is described in relation to FIG. 4.

Figure 4:
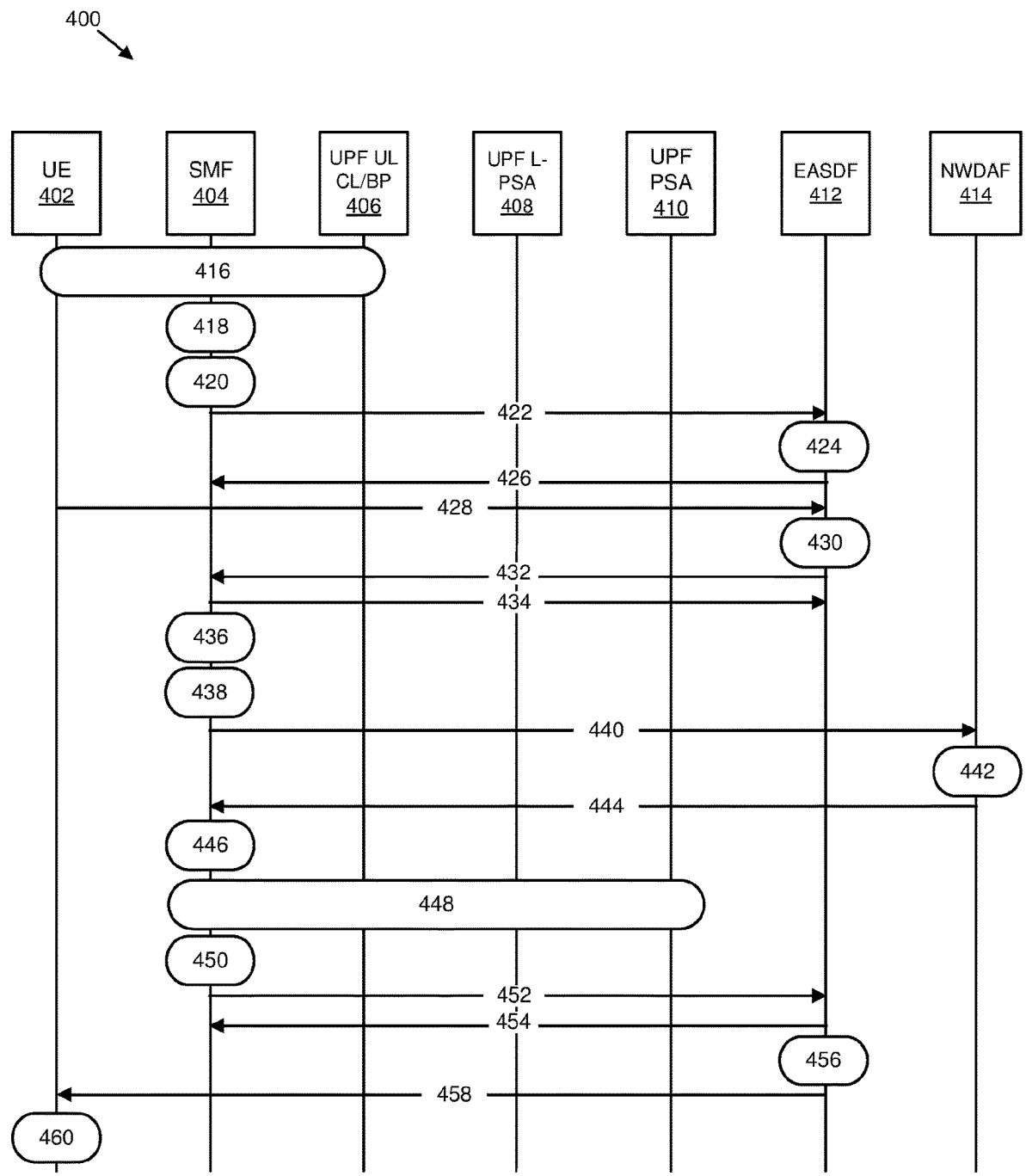
FIG. 4 is a schematic block diagram illustrating one embodiment of communications in a system for selecting an EAS server.

FIG. 4 is a schematic block diagram illustrating one embodiment of communications in a system 400 for selecting an EAS server (e.g., first embodiment). The system 400 includes a UE 402, an SMF 404, a UPF uplink ("UL") classifier ("CL") and/or branching point ("BP") 406, a UPF local ("L") protocol data unit ("PDU") session anchor ("PSA") ("L-PSA") 408, a UPF PSA 410, an EASDF 412, and an NWDAF 414. It should be noted that each of the communications may include one or more messages.

In a first communication 416, the UE 402 establishes a PDU session with a PDU session establishment procedure.

During the PDU session establishment procedure, the SMF 404 selects 418 the EASDF 412 to be used as a DNS server for this PDU session.

The SMF 404 determines 420 initial DNS message handling rules. The initial DNS message handling rules instruct the EASDF 412 to buffer DNS queries received by the UE 402 on this PDU session and forward the contents of the DNS query to the SMF 404.

In a second communication 422, the SMF 404 provides the DNS message handling rules to the EASDF 412 by invoking an Neasdf_DNSContext_Create request.

The EASDF 412 creates 424 a DNS context for the UE and stores the DNS message handling rules.

In a third communication 426, the EASDF 412 acknowledge the request with an easdf_DNSContext_Create response.

An application in the UE 402 may request to establish a connection with an EAS server and creates a DNS query.

In a fourth communication 428, a DNS query is sent via the PDU session allocated for the application (e.g., based on UE route selection policy ("URSP") rules).

The DNS query is received at the EASDF 412. The EASDF 412 determines 430 based on the DNS message handling rules that the DNS query needs to be buffered and the contents of the DNS query needs to be forwarded to the SMF 404.

In a fifth communication 432, the EASDF 412 invokes an Neasdf_DNSContext_Notify request including in the request the contents of the DNS query. The contents of the DNS query may include a range of FQDNs or may include an IP address of the DNS server requested by the application.

In a sixth communication 434, the SMF 404 acknowledges the response with an Neasdf_DNSContext_Notify response.

The SMF 404 identifies 436 the UE location and determines that, at the UE location, analytics may be used to determine an EAS IP address. The SMF 404 may determine that analytics may be used based on pre-configuration. In some embodiments, the SMF 404 may query a network repository function ("NRF") to determine if there is an NWDAF in the service area of the UE location that supports DN performance and/or server experience analytics.

The SMF 404 constructs 438 a request for analytics using the contents of the DNS query.

In a seventh communication 440, the SMF 404 sends an analytics request including an analytic ID set to DN performance (or service experience) and analytic filters for the location of the UE and the FQDN of the DNS query.

The NWDAF 414 derives 442 analytics at the UE location.

In an eighth communication 444, in an analytics response the NWDAF 414 includes a list of EAS server addresses and their associated performance.

The SMF 404 may select 446 the best performing EAS server (e.g., one or more EAS server IP addresses).

In an optional ninth communication 448, the SMF 404 may perform UL CL and/or PDU session anchor ("PSA") insertion based on the selected EAS server.

The SMF 404 constructs 450 an action for the EASDF 412 where the action indicates to the EASDF 412 to create a DNS response for the UE 402 including the selected EAS IP addresses. There may be a number of alternative actions as follows: 1) the SMF 404 provides updated DNS message handling rules where the rules indicate to the EASDF 412 to create a DNS response; 2) the SMF 404 sends a new service operation including an action to create a DNS response with the selected EAS servers; and/or 3) the SMF 404 creates the DNS response and instructs the EASDF 412 to forward it to the UE 402.

In a tenth communication 452, the SMF 404 creates a service operation including an instruction and/or rule for the EASDF 412 as described in step 450.

In an eleventh communication 454, the EASDF 412 acknowledges the request.

The EASDF 412 constructs 456 a DNS response or forwards the DNS response to the UE 402 as instructed in steps 450 and 452.

In a twelfth communication 458, the EASDF 412 provides the DNS response with the selected EAS IP addresses to the UE 402 via the existing PDU session.

The application in the UE 402 connects 460 to the selected EAS server.

In a second embodiment, an EASDF requests DN performance analytics to select an EAS server and constructs a DNS response to be provided to a UE. In the second embodiment, if the EASDF, based on DNS message handling rules configured by the SMF, forwards the contents of a DNS query received from a UE to the SMF, the SMF sends instructions to the EASDF to request analytics from an NWDAF and may indicate to the EASDF to select a best performing EAS server.

The instructions may be in a form of an updated DNS message handling rule. The updated DNS message handling rule may include: 1) a precedence of the DNS message handling rule; 2) a DNS message detection template (e.g., including at least one of the following): a) a DNS message type=DNS Query; b) a source IP address (e.g., UE IP address); and/or c) an array of FQDN ranges; 2) actions: a) select best performing EAS IP address at a UE location for the FQDN requested; and/or b) report a selected server to the SMF. One example of the second embodiment is shown in FIG. 5.

Figure 5:
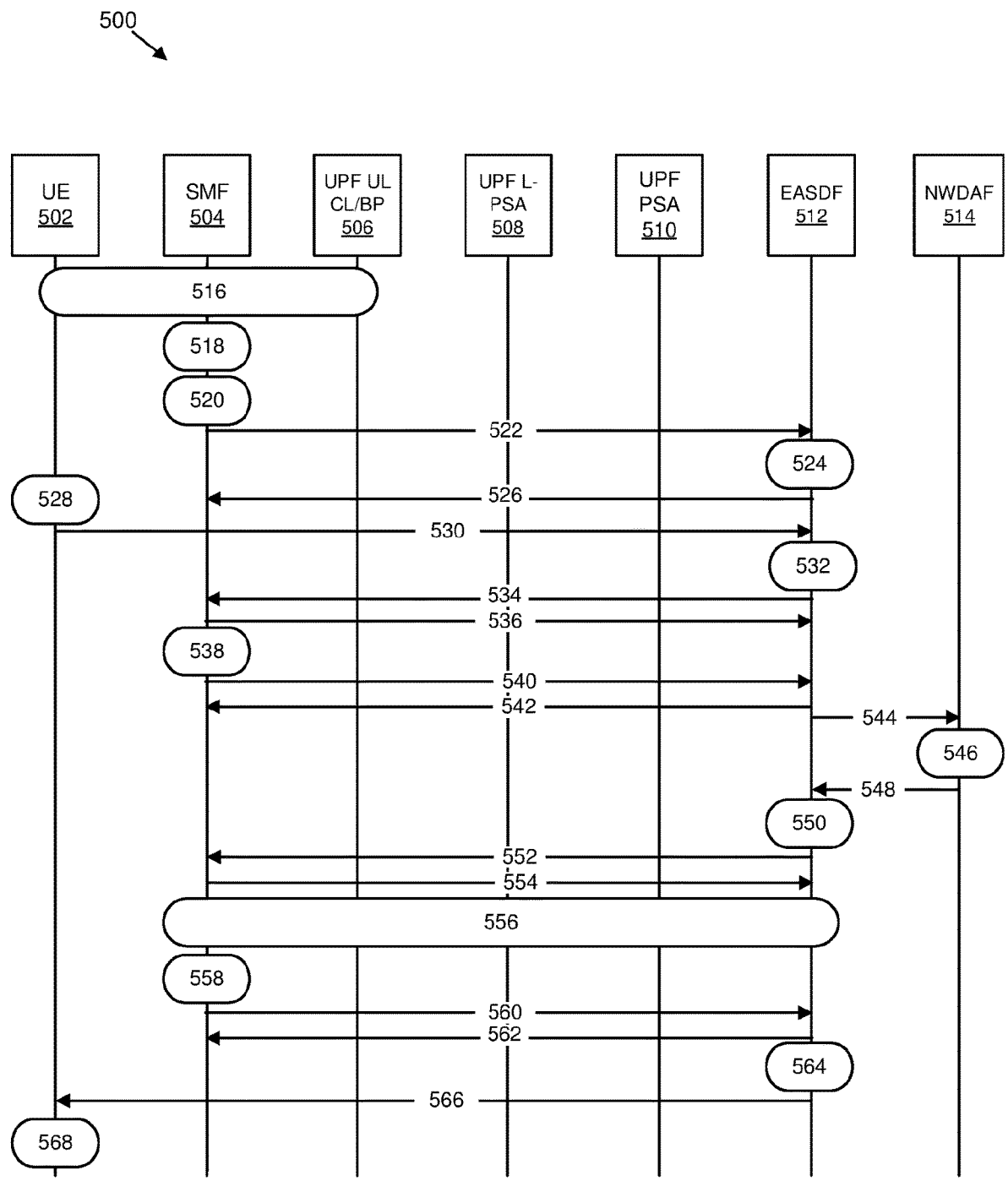
FIG. 5 is a schematic block diagram illustrating another embodiment of communications in a system for selecting an EAS server.

FIG. 5 is a schematic block diagram illustrating another embodiment of communications in a system 500 for selecting an EAS server (e.g., second embodiment). The system 500 includes a UE 502, an SMF 504, a UPF UL CL and/or BP 506, a UPF L-PSA 508, a UPF PSA 510, an EASDF 512, and an NWDAF 514. It should be noted that each of the communications may include one or more messages.

In a first communication 516, the UE 502 establishes a PDU session via a PDU session establishment procedure.

During the PDU session establishment procedure, the SMF 504 selects 518 the EASDF 512 to be used as a DNS server for this PDU session.

The SMF 504 determines 520 initial DNS message handling rules. The initial DNS message handling rules instructs the EASDF 512 to buffer DNS queries received by the UE 502 on this PDU session and forward the contents of the DNS query to the SMF 504.

In a second communication 522, the SMF 504 provides the DNS message handling rules to the EASDF 512 by invoking an Neasdf_DNSContext_Create request.

The EASDF 512 creates 524 a DNS context for the UE 502 and stores the DNS message handling rules.

In a third communication 526, the EASDF 512 acknowledge the request with an easdf_DNSContext_Create response.

An application in the UE 502 requests 528 to establish a connection with an EAS server and creates a DNS query.

In a fourth communication 530, a DNS query is sent via the PDU session allocated for the application (e.g., based on URSP rules).

The DNS query is received at the EASDF 512. The EASDF 512 determines 532 based on the DNS message handling rules that the DNS query needs to be buffered and the contents of the DNS query needs to be forwarded to the SMF 504.

In a fifth communication 534, the EASDF 512 invokes an Neasdf_DNSContext_Notify request including in the request the contents of the DNS query. The contents of the DNS query may include a range of FQDNs or may include an IP address of the DNS server requested by the application.

In a sixth communication 536, the SMF 504 acknowledges the response with an Neasdf_DNSContext_Notify response.

The SMF 504 identifies 538 the UE 502 location and determines that at the UE 502 location analytics may be used to determine an EAS IP address. The SMF 504 may determine that analytics can be used based on pre-configuration. In various embodiments, the SMF 504 may query an NRF to determine if there is the NWDAF 514 in the service area of the UE 502 location that supports DN performance and/or server experience analytics.

In a seventh communication 540, the SMF 504 instructs the EASDF 512 to request DN performance analytics from the NWDAF 514 instead of forwarding the request to a DNS server. The instruction may be in form of an action or a DNS message handling rule or rules (e.g., Neasdf_DNSContext_Update request). The SMF 504 includes the location of the UE 502 in the request.

In an eighth communication 542, the EASDF 512 acknowledges the request (e.g., with an Neasdf_DNSContext_Update response).

In a ninth communication 544, the EASDF 512 sends an analytics request including an analytic ID set to DN performance (or service experience) and including analytic filters for the location of the UE 502 and FQDNs of the DNS query at the location of the UE 502.

The NWDAF 514 derives 546 analytics at the UE 502 location.

In a tenth communication 548, in the analytics response, the NWDAF 514 includes a list of EAS server addresses at the UE 502 location and their associated performance.

The EASDF 512 may select 550 the best performing EAS server.

In an eleventh communication 552, the EASDF 512 informs the SMF 504 of the selected EAS server and DNAI (e.g., if provided in the analytic report) (e.g., in an Neasdf_DNSContext_Notify request).

In a twelfth communication 554, the SMF 504 acknowledges the request (e.g., with an Neasdf_DNSContext_Notify response).

In an optional thirteenth communication 556, the SMF 504 may perform UL CL and/or PSA insertion based on the selected EAS server.

The SMF 504 constructs 558 an action for the EASDF 512 where the action indicates to the EASDF 512 to create a DNS response for the UE 502 includes the selected EAS IP addresses. There may be a number of possible actions as follows: 1) the SMF 504 provides updated DNS message handling rules in which the rule indicates to the EASDF 512 to create a DNS response; 2) the SMF 504 sends a new service operation including an action to create a DNS response with the selected EAS servers; and/or 3) the SMF creates the DNS response and instructs the EASDF 512 to forward it to the UE 502.

In a fourteenth communication 560, the SMF 504 creates a service operation including an indication to create a DNS response with the selected EAS servers. In certain embodiments, the SMF 504 creates the DNS response and instructs the EASDF 512 to forward the DNS response to the UE 502.

In a fifteenth communication 562, the EASDF 512 acknowledges the request.

The EASDF 512 constructs 564 a DNS response or forwards the DNS response to the UE 502 if provided by the SMF 504.

In a sixteenth communication 566, the EASDF 512 provides the DNS response with the selected EAS IP addresses to the UE 502 via the existing PDU session.

The application in the UE 502 connects 568 to the selected EAS server.

Figure 6:
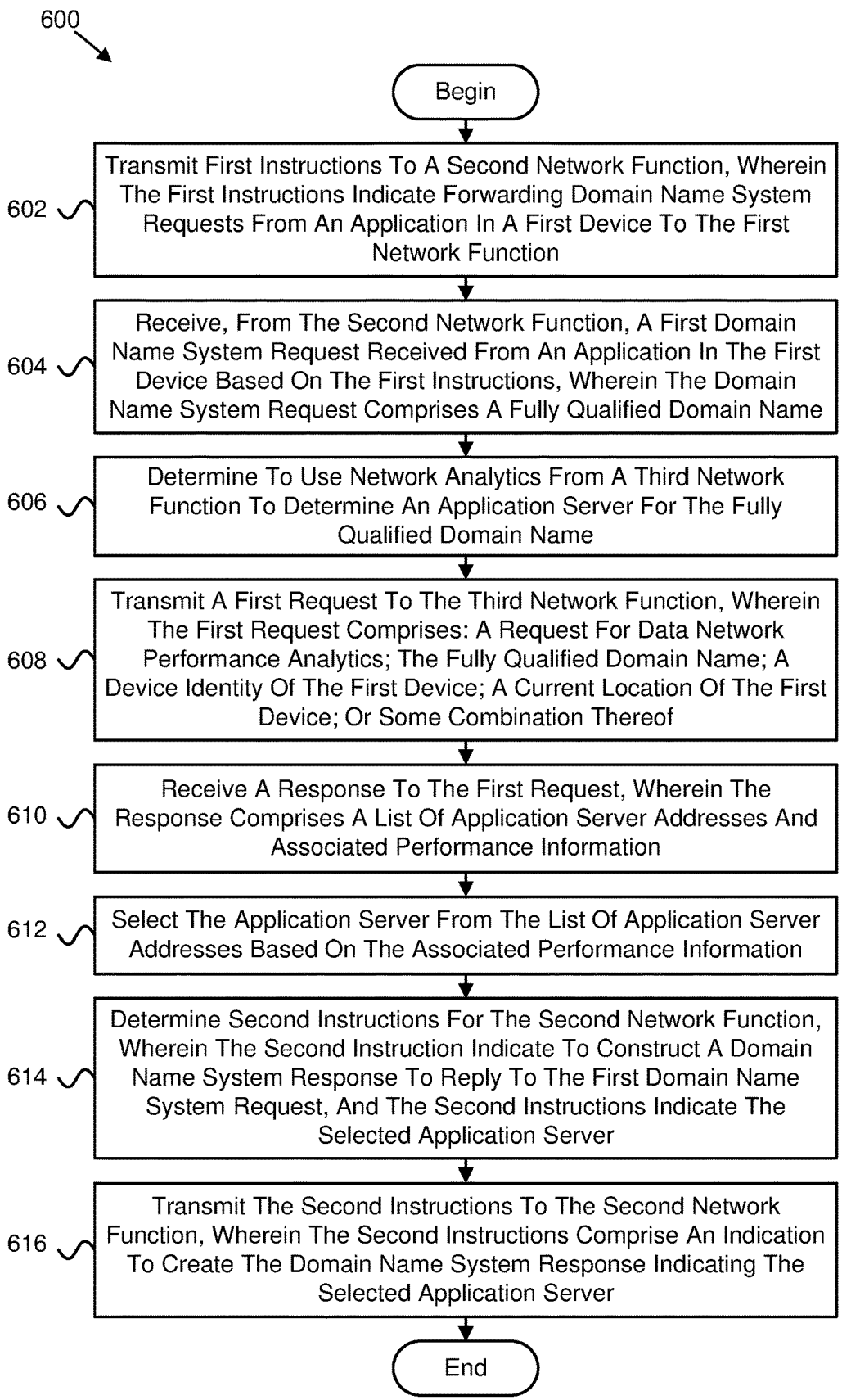
FIG. 6 is a flow chart diagram illustrating one embodiment of a method for domain name system determination.

FIG. 6 is a flow chart diagram illustrating one embodiment of a method 600 for domain name system determination. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes transmitting 602, from a first network function, first instructions to a second network function. The first instructions indicate forwarding domain name system requests from an application in a first device to the first network function. In some embodiments, the method 600 includes receiving 604, from the second network function, a first domain name system request received from an application in the first device based on the first instructions. The domain name system request includes a fully qualified domain name. In certain embodiments, the method 600 includes determining 606 to use network analytics from a third network function to determine an application server for the fully qualified domain name. In various embodiments, the method 600 includes transmitting 608 a first request to the third network function. The first request includes: a request for data network performance analytics; the fully qualified domain name; a device identity of the first device; a current location of the first device; or some combination thereof. In some embodiments, the method 600 includes receiving 610 a response to the first request. The response includes a list of application server addresses and associated performance information. In certain embodiments, the method 600 includes selecting 612 the application server from the list of application server addresses based on the associated performance information. In various embodiments, the method 600 includes determining 614 second instructions for the second network function. The second instructions indicate to construct a domain name system response to reply to the first domain name system request, and the second instructions indicate the selected application server. In some embodiments, the method 600 includes transmitting 616 the second instructions to the second network function. The second instructions include an indication to create the domain name system response indicating the selected application server.

In certain embodiments, the first network function comprises a session management function. In some embodiments, the second network function comprises an edge application server discovery function. In various embodiments, the third network function comprises a network data analytics function.

In one embodiment, the first device comprises a user equipment. In certain embodiments, the second instructions are included within domain name system message handling rules. In some embodiments, the domain name system message handling rules comprise an action to create a domain name system response, and the domain name system response comprises an internet protocol address of the selected application server.

In various embodiments, the second instructions comprise a constructed domain name system response, and the constructed domain name system response comprises an internet protocol address of the selected application server and an action to forward the constructed domain name system to the first device. In one embodiment, the second instructions comprise an action to create a domain name system response, the domain name system response comprises an internet protocol address of the selected application server, and the domain name system response is transmitted to the first device.

Figure 7:
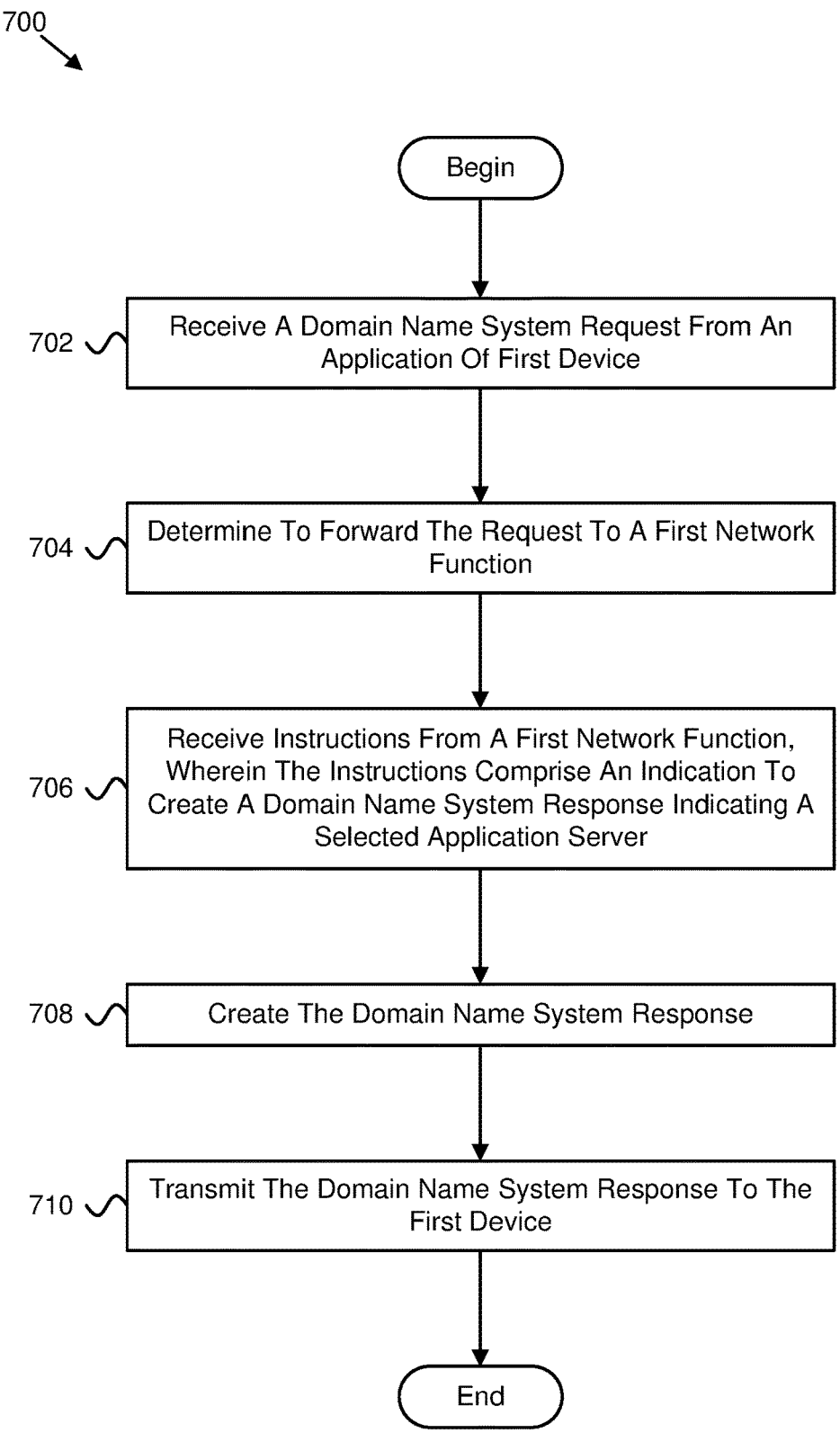
FIG. 7 is a flow chart diagram illustrating another embodiment of a method for domain name system determination.

FIG. 7 is a flow chart diagram illustrating another embodiment of a method 700 for domain name system determination. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702, at a second network function a domain name system request from an application of first device. In some embodiments, the method 700 includes determining 704 to forward the request to a first network function. In certain embodiments, the method 700 includes receiving 706 instructions from a first network function. The instructions include an indication to create a domain name system response indicating a selected application server. In various embodiments, the method 700 includes creating 708 the domain name system response. In some embodiments, the method 700 includes transmitting 710 the domain name system response to the first device.

In certain embodiments, the first network function comprises a session management function. In some embodiments, the second network function comprises an edge application server discovery function. In various embodiments, the first device comprises a user equipment.

In one embodiment, the instructions are included within domain name system message handling rules. In certain embodiments, the domain name system message handling rules comprise an action to create a domain name system response, and the domain name system response comprises an internet protocol address of the selected application server.

In some embodiments, the instructions comprise a constructed domain name system response, and the constructed domain name system response comprises an internet protocol address of the selected application server and an action to forward the constructed domain name system to the first device. In various embodiments, the instructions comprise an action to create a domain name system response, the domain name system response comprises an internet protocol address of the selected application server, and the domain name system response is transmitted to the first device.

Figure 8:
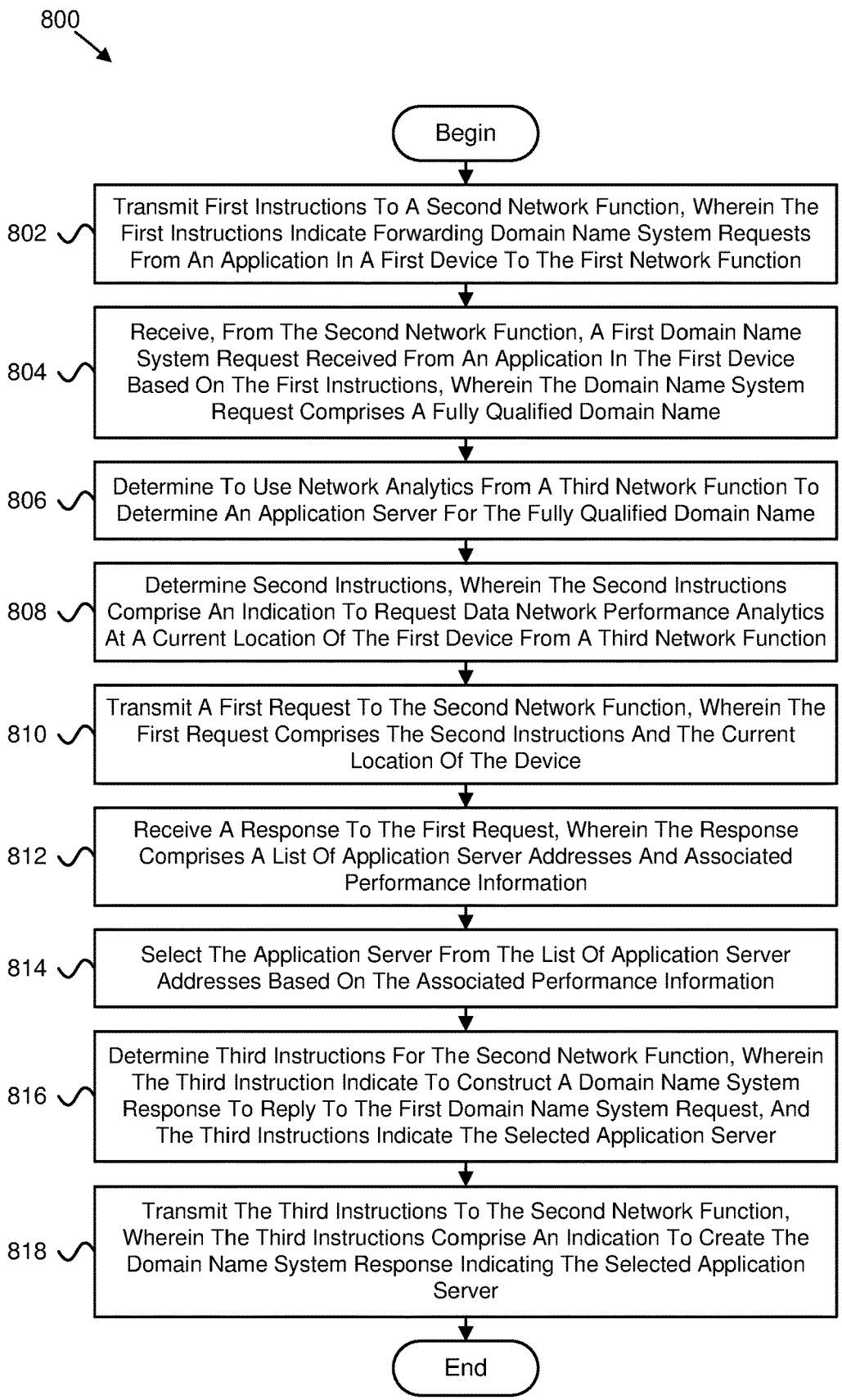
FIG. 8 is a flow chart diagram illustrating a further embodiment of a method for domain name system determination.

FIG. 8 is a flow chart diagram illustrating a further embodiment of a method 800 for domain name system determination. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes transmitting 802, from a first network function, first instructions to a second network function. The first instructions indicate forwarding domain name system requests from an application in a first device to the first network function. In some embodiments, the method 800 includes receiving 804, from the second network function, a first domain name system request received from an application in the first device based on the first instructions. The domain name system request includes a fully qualified domain name. In some embodiments, the method 800 includes determining 806 to use network analytics from a third network function to determine an application server for the fully qualified domain name. In certain embodiments, the method 800 includes determining 808 second instructions. The second instructions include an indication to request data network performance analytics at a current location of the first device from a third network function. In various embodiments, the method 800 includes transmitting 810 a first request to the second network function. The first request includes the second instructions and the current location of the device. In some embodiments, the method 800 includes receiving 812 a response to the first request. The response includes a list of application server addresses and associated performance information. In certain embodiments, the method 800 includes selecting 814 the application server from the list of application server addresses based on the associated performance information. In various embodiments, the method 800 includes determining 816 third instructions for the second network function. The third instruction indicate to construct a domain name system response to reply to the first domain name system request, and the third instructions indicate the selected application server. In some embodiments, the method 800 includes transmitting 818 the third instructions to the second network function. The third instructions include an indication to create the domain name system response indicating the selected application server.

In certain embodiments, the first network function comprises a session management function. In some embodiments, the second network function comprises an edge application server discovery function. In various embodiments, the third network function comprises a network data analytics function.

In one embodiment, the first device comprises a user equipment. In certain embodiments, the second instructions are included within domain name system message handling rules. In some embodiments, the domain name system message handling rules comprise an action to create the list of application server addresses and associated performance information.

In various embodiments, the third instructions are included within domain name system message handling rules. In one embodiment, the domain name system message handling rules comprise an action to create a domain name system response, and the domain name system response comprises an internet protocol address of the selected application server.

In certain embodiments, the third instructions comprise a constructed domain name system response, and the constructed domain name system response comprises an internet protocol address of the selected application server and an action to forward the constructed domain name system to the first device. In some embodiments, the third instructions comprise an action to create a domain name system response, the domain name system response comprises an internet protocol address of the selected application server, and the domain name system response is transmitted to the first device.

In one embodiment, a method of a first network function comprises: transmitting first instructions to a second network function, wherein the first instructions indicate forwarding domain name system requests from an application in a first device to the first network function; receiving, from the second network function, a first domain name system request received from an application in the first device based on the first instructions, wherein the domain name system request comprises a fully qualified domain name; determining to use network analytics from a third network function to determine an application server for the fully qualified domain name; transmitting a first request to the third network function, wherein the first request comprises: a request for data network performance analytics; the fully qualified domain name; a device identity of the first device; a current location of the first device; or some combination thereof; receiving a response to the first request, wherein the response comprises a list of application server addresses and associated performance information; selecting the application server from the list of application server addresses based on the associated performance information; determining second instructions for the second network function, wherein the second instructions indicate to construct a domain name system response to reply to the first domain name system request, and the second instructions indicate the selected application server; and transmitting the second instructions to the second network function, wherein the second instructions comprise an indication to create the domain name system response indicating the selected application server.

In certain embodiments, the first network function comprises a session management function.

In some embodiments, the second network function comprises an edge application server discovery function.

In various embodiments, the third network function comprises a network data analytics function.

In one embodiment, the first device comprises a user equipment.

In certain embodiments, the second instructions are included within domain name system message handling rules.

In some embodiments, the domain name system message handling rules comprise an action to create a domain name system response, and the domain name system response comprises an internet protocol address of the selected application server.

In various embodiments, the second instructions comprise a constructed domain name system response, and the constructed domain name system response comprises an internet protocol address of the selected application server and an action to forward the constructed domain name system to the first device.

In one embodiment, the second instructions comprise an action to create a domain name system response, the domain name system response comprises an internet protocol address of the selected application server, and the domain name system response is transmitted to the first device.

In one embodiment, an apparatus comprises a first network function. The apparatus further comprises: a transmitter that transmits first instructions to a second network function, wherein the first instructions indicate forwarding domain name system requests from an application in a first device to the first network function; a receiver that receives, from the second network function, a first domain name system request received from an application in the first device based on the first instructions, wherein the domain name system request comprises a fully qualified domain name; and a processor that determines to use network analytics from a third network function to determine an application server for the fully qualified domain name, wherein: the transmitter transmits a first request to the third network function, wherein the first request comprises: a request for data network performance analytics; the fully qualified domain name; a device identity of the first device; a current location of the first device; or some combination thereof; the receiver receives a response to the first request, wherein the response comprises a list of application server addresses and associated performance information; the processor selects the application server from the list of application server addresses based on the associated performance information; the processor determines second instructions for the second network function, wherein the second instructions indicate to construct a domain name system response to reply to the first domain name system request, and the second instructions indicate the selected application server; and the transmitter transmits the second instructions to the second network function, wherein the second instructions comprise an indication to create the domain name system response indicating the selected application server.

In certain embodiments, the first network function comprises a session management function.

In some embodiments, the second network function comprises an edge application server discovery function.

In various embodiments, the third network function comprises a network data analytics function.

In one embodiment, the first device comprises a user equipment.

In certain embodiments, the second instructions are included within domain name system message handling rules.

In some embodiments, the domain name system message handling rules comprise an action to create a domain name system response, and the domain name system response comprises an internet protocol address of the selected application server.

In various embodiments, the second instructions comprise a constructed domain name system response, and the constructed domain name system response comprises an internet protocol address of the selected application server and an action to forward the constructed domain name system to the first device.

In one embodiment, the second instructions comprise an action to create a domain name system response, the domain name system response comprises an internet protocol address of the selected application server, and the domain name system response is transmitted to the first device.

In one embodiment, a method of a second network function comprises: receiving a domain name system request from an application of first device; determining to forward the request to a first network function; receiving instructions from a first network function, wherein the instructions comprise an indication to create a domain name system response indicating a selected application server; creating the domain name system response; and transmitting the domain name system response to the first device.

In certain embodiments, the first network function comprises a session management function.

In some embodiments, the second network function comprises an edge application server discovery function.

In various embodiments, the first device comprises a user equipment.

In one embodiment, the instructions are included within domain name system message handling rules.

In certain embodiments, the domain name system message handling rules comprise an action to create a domain name system response, and the domain name system response comprises an internet protocol address of the selected application server.

In some embodiments, the instructions comprise a constructed domain name system response, and the constructed domain name system response comprises an internet protocol address of the selected application server and an action to forward the constructed domain name system to the first device.

In various embodiments, the instructions comprise an action to create a domain name system response, the domain name system response comprises an internet protocol address of the selected application server, and the domain name system response is transmitted to the first device.

In one embodiment, an apparatus comprises a second network function. The apparatus further comprises: a receiver that receives a domain name system request from an application of first device; a processor that: determines to forward the request to a first network function, wherein the receiver receives instructions from a first network function, and the instructions comprise an indication to create a domain name system response indicating a selected application server; and creates the domain name system response; and a transmitter that transmits the domain name system response to the first device.

In certain embodiments, the first network function comprises a session management function.

In some embodiments, the second network function comprises an edge application server discovery function.

In various embodiments, the first device comprises a user equipment.

In one embodiment, the instructions are included within domain name system message handling rules.

In certain embodiments, the domain name system message handling rules comprise an action to create a domain name system response, and the domain name system response comprises an internet protocol address of the selected application server.

In some embodiments, the instructions comprise a constructed domain name system response, and the constructed domain name system response comprises an internet protocol address of the selected application server and an action to forward the constructed domain name system to the first device.

In various embodiments, the instructions comprise an action to create a domain name system response, the domain name system response comprises an internet protocol address of the selected application server, and the domain name system response is transmitted to the first device.

In one embodiment, a method of a first network function comprises: transmitting first instructions to a second network function, wherein the first instructions indicate forwarding domain name system requests from an application in a first device to the first network function; receiving, from the second network function, a first domain name system request received from an application in the first device based on the first instructions, wherein the domain name system request comprises a fully qualified domain name; determining to use network analytics from a third network function to determine an application server for the fully qualified domain name; determining second instructions, wherein the second instructions comprise an indication to request data network performance analytics at a current location of the first device from a third network function; transmitting a first request to the second network function, wherein the first request comprises the second instructions and the current location of the device; receiving a response to the first request, wherein the response comprises a list of application server addresses and associated performance information; selecting the application server from the list of application server addresses based on the associated performance information; determining third instructions for the second network function, wherein the third instruction indicate to construct a domain name system response to reply to the first domain name system request, and the third instructions indicate the selected application server; and transmitting the third instructions to the second network function, wherein the third instructions comprise an indication to create the domain name system response indicating the selected application server.

In certain embodiments, the first network function comprises a session management function.

In some embodiments, the second network function comprises an edge application server discovery function.

In various embodiments, the third network function comprises a network data analytics function.

In one embodiment, the first device comprises a user equipment.

In certain embodiments, the second instructions are included within domain name system message handling rules.

In some embodiments, the domain name system message handling rules comprise an action to create the list of application server addresses and associated performance information.

In various embodiments, the third instructions are included within domain name system message handling rules.

In one embodiment, the domain name system message handling rules comprise an action to create a domain name system response, and the domain name system response comprises an internet protocol address of the selected application server.

In certain embodiments, the third instructions comprise a constructed domain name system response, and the constructed domain name system response comprises an internet protocol address of the selected application server and an action to forward the constructed domain name system to the first device.

In some embodiments, the third instructions comprise an action to create a domain name system response, the domain name system response comprises an internet protocol address of the selected application server, and the domain name system response is transmitted to the first device.

In one embodiment, an apparatus comprises a first network function. The apparatus further comprises: a transmitter that transmits first instructions to a second network function, wherein the first instructions indicate forwarding domain name system requests from an application in a first device to the first network function; a receiver that receives, from the second network function, a first domain name system request received from an application in the first device based on the first instructions, wherein the domain name system request comprises a fully qualified domain name; and a processor that: determines to use network analytics from a third network function to determine an application server for the fully qualified domain name; and determines second instructions, wherein the second instructions comprise an indication to request data network performance analytics at a current location of the first device from a third network function, wherein: the transmitter transmits a first request to the second network function, wherein the first request comprises the second instructions and the current location of the device; the receiver receives a response to the first request, wherein the response comprises a list of application server addresses and associated performance information; the processor selects the application server from the list of application server addresses based on the associated performance information; the processor determines third instructions for the second network function, wherein the third instruction indicate to construct a domain name system response to reply to the first domain name system request, and the third instructions indicate the selected application server; and the transmitter transmits the third instructions to the second network function, wherein the third instructions comprise an indication to create the domain name system response indicating the selected application server.

In certain embodiments, the first network function comprises a session management function.

In some embodiments, the second network function comprises an edge application server discovery function.

In various embodiments, the third network function comprises a network data analytics function.

In one embodiment, the first device comprises a user equipment.

In certain embodiments, the second instructions are included within domain name system message handling rules.

In some embodiments, the domain name system message handling rules comprise an action to create the list of application server addresses and associated performance information.

In various embodiments, the third instructions are included within domain name system message handling rules.

In one embodiment, the domain name system message handling rules comprise an action to create a domain name system response, and the domain name system response comprises an internet protocol address of the selected application server.

In certain embodiments, the third instructions comprise a constructed domain name system response, and the constructed domain name system response comprises an internet protocol address of the selected application server and an action to forward the constructed domain name system to the first device.

In some embodiments, the third instructions comprise an action to create a domain name system response, the domain name system response comprises an internet protocol address of the selected application server, and the domain name system response is transmitted to the first device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of performing a first network function, the method comprising:
transmitting first instructions to a second network function, wherein the first instructions indicate forwarding domain name system requests from an application in a first device to the first network function;
receiving, from the second network function, a first domain name system request received from an application in the first device based on the first instructions, wherein the domain name system request comprises a fully qualified domain name;
determining to use network analytics from a third network function to determine an application server for the fully qualified domain name;
transmitting a first request to the third network function, wherein the first request comprises:
a request for data network performance analytics;
the fully qualified domain name;
a device identity of the first device;
a current location of the first device;
or a combination thereof;
receiving a response to the first request, wherein the response comprises a list of application server addresses and associated performance information;
selecting the application server from the list of application server addresses based on the associated performance information;
determining second instructions for the second network function, wherein the second instructions indicate to construct a domain name system response to reply to the first domain name system request, and the second instructions indicate the selected application server; and
transmitting the second instructions to the second network function, wherein the second instructions comprise an indication to create the domain name system response indicating the selected application server.

2. An apparatus of a first network function, comprising:
at least one memory; and
at least one processor coupled with the at least one memory and configured to cause the apparatus to:
transmit first instructions to a second network function, wherein the first instructions indicate forwarding domain name system requests from an application in a first device to the first network function;
receive, from the second network function, a first domain name system request received from an application in the first device based on the first instructions, wherein the domain name system request comprises a fully qualified domain name;
determine to use network analytics from a third network function to determine an application server for the fully qualified domain name;
transmit a first request to the third network function, wherein the first request comprises:
a request for data network performance analytics;
the fully qualified domain name;
a device identity of the first device;
a current location of the first device;
or a combination thereof;
receive a response to the first request, wherein the response comprises a list of application server addresses and associated performance information;
select the application server from the list of application server addresses based on the associated performance information;
determine second instructions for the second network function, wherein the second instructions indicate to construct a domain name system response to reply to the first domain name system request, and the second instructions indicate the selected application server; and
transmit the second instructions to the second network function, wherein the second instructions comprise an indication to create the domain name system response indicating the selected application server.

3. The apparatus of claim 2, wherein the first network function comprises a session management function.

4. The apparatus of claim 3, wherein the second network function comprises an edge application server discovery function.

5. The apparatus of claim 4, wherein the third network function comprises a network data analytics function.

6. The apparatus of claim 5, wherein the first device comprises a user equipment (UE).

7. The apparatus of claim 6, wherein the second instructions are included within domain name system message handling rules.

8. The apparatus of claim 7, wherein the domain name system message handling rules comprise an action to create a domain name system response, and the domain name system response comprises an internet protocol address of the selected application server.

9. The apparatus of claim 8, wherein the second instructions comprise a constructed domain name system response, and the constructed domain name system response comprises an internet protocol address of the selected application server and an action to forward the constructed domain name system to the first device.

10. The apparatus of claim 8, wherein the second instructions comprise an action to create a domain name system response, the domain name system response comprises an internet protocol address of the selected application server, and the domain name system response is transmitted to the first device.

11. An apparatus of a second network function, comprising:
   at least one memory; and
   at least one processor coupled with the at least one memory and configured to cause the apparatus to:
      receive a domain name system request from an application of first device;
      determine to forward the request to a first network function;
      receive instructions from a first network function, and the instructions comprise an indication to create a domain name system response indicating a selected application server;
      create the domain name system response; and
      transmit the domain name system response to the first device.

12. The apparatus of claim 11, wherein the first network function comprises a session management function.

13. The apparatus of claim 12, wherein the second network function comprises an edge application server discovery function.

14. The apparatus of claim 13, wherein the first device comprises a user equipment (UE).

15. The apparatus of claim 14, wherein the instructions are included within domain name system message handling rules.

16. A method of performing a second network function, the method comprising:
   receiving a domain name system request from an application of first device;
   determining to forward the request to a first network function;
   receiving instructions from a first network function, wherein the instructions comprise an indication to create a domain name system response indicating a selected application server;
   creating the domain name system response; and
   transmitting the domain name system response to the first device.

17. The method of claim 16, wherein the first network function comprises a session management function.

18. The method of claim 17, wherein the second network function comprises an edge application server discovery function.

19. The method of claim 18, wherein the first device comprises a user equipment (UE).

20. The method of claim 19, wherein the instructions are included within domain name system message handling rules.

* * * * *